Jan. 12, 1971　　　　E. R. KEELER ET AL　　　　3,553,955
ELECTRONIC WATCH

Filed July 8, 1969　　　　　　　　　　　　　　3 Sheets-Sheet 1

INVENTORS
NORMAN C. ZATSKY
EUGENE R. KEELER
BY
Davis, Hoxie, Faithfull & Hapgood
ATTORNEYS Jan. 12, 1971    E. R. KEELER ET AL    3,553,955
ELECTRONIC WATCH Filed July 8, 1969    3 Sheets-Sheet 2

INVENTORS
NORMAN C. ZATSKY
EUGENE R. KEELER
BY
Davis, Hoxie, Faithfull & Hapgood
ATTORNEYS

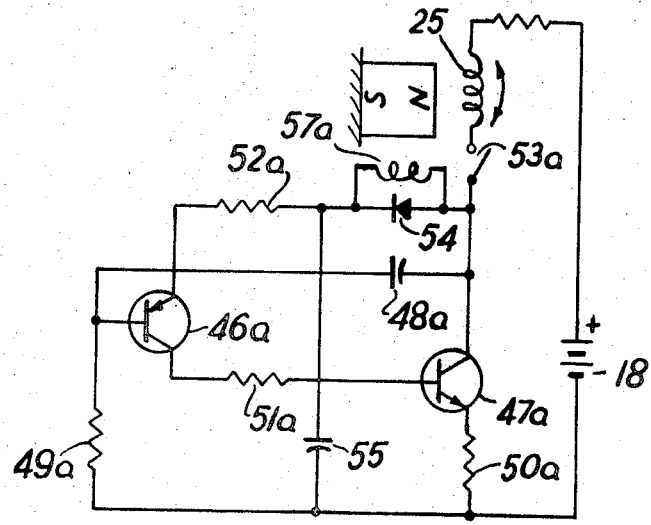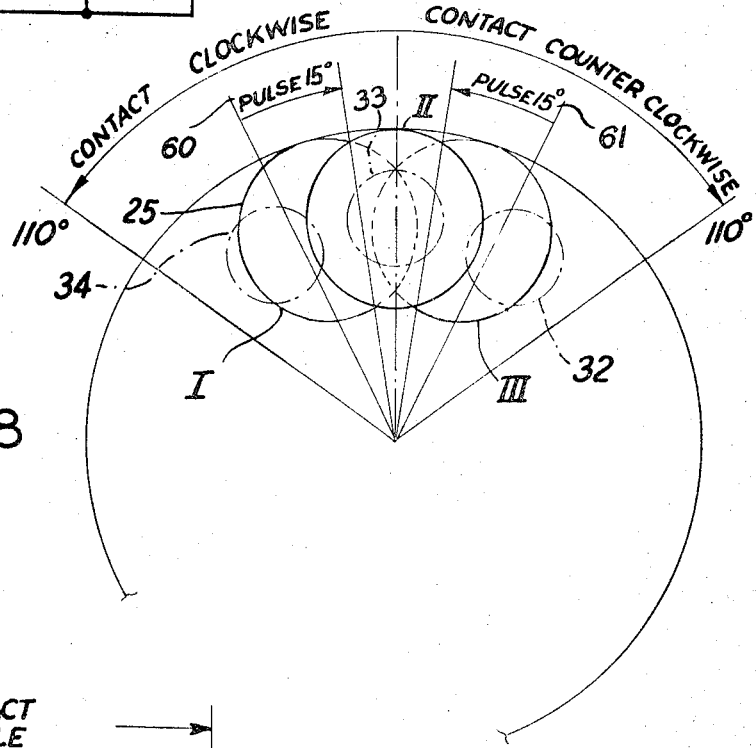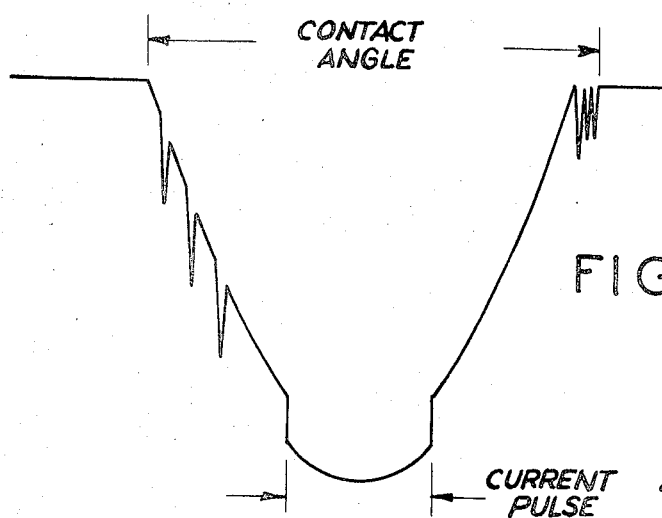

United States Patent Office 3,553,955
Patented Jan. 12, 1971

3,553,955
ELECTRONIC WATCH
Eugene R. Keeler, Suffern, and Norman C. Zatsky, Briarcliff Manor, N.Y., assignors to Timex Corporation, Waterbury, Conn., a corporation of Connecticut
Filed July 8, 1969, Ser. No. 839,855
Int. Cl. G04c *3/04*
U.S. Cl. 58—28                 5 Claims

ABSTRACT OF THE DISCLOSURE

An electronic horological instrument includes a source of power, an electronic circuit, an oscillator, such as a balance wheel, carrying an electric coil and a magnet whose field cooperates with the coil. A hub on the balance wheel staff is attached to one end of a hairspring whose opposite end is connected to the frame. The oscillator carries a conductive pin which makes contact with a spring arm for predetermined periods. The electrical connections to the coil are through the hairspring and the pin and spring.

---

The present invention relates to horology and more particularly to an electronic horological movement.

In the horological industry a distinction is sometimes made between "electronic" movements and "electric" movements. Literally, all electronic movements are electric in the sense that they utilize electricity, in contrast to a mainspring or some other source of power. However, conventionally it is understood that electric watches are those that have an electrical switching function performed by a physical electrical make and break contact. Electronic watches replace that contact by an electronic device such as a solid-state transistor.

It is believed that electric horological movements, such as watches, will fail due to the corrosion or wearing away of the contact mechanism, particularly by electric arcing at the contact points. The problem of such wear has been attempted to be solved, in contact electric watches, by the use of precious metals at the contacts, and expensive and complex contact damping mechanisms. A contact electrical horological movement, having an oscillator of a frequency of 3 Hz., will open and close its contacts 10,800 times an hour, or over 94 million times a year. If the contacts should fail or make irregular contact, the watch may cease to function as an accurate timekeeper, or stop. Repairs of the contacts may be relatively difficult and expensive.

Electronic movements, compared to electric movements using contacts, are generally more expensive, delicate and complex. Nevertheless, they are often preferred because some electronic devices, such as transistors, are relatively reliable over a long period.

Electronic horological movements which are electromechanical usually utilize one or more coils which interact with one or more magnetic fields, the fields usually being created by permanent magnets. It may be preferable that the magnets are fixed and that the coil is carried by the oscillator. A moving magnet may present difficulties in regard to poising of the oscillator and may cause stray magnetic fields. If the coil is carried by the oscillator, there must be some way to make electric contact with its terminals. It has been suggested that the movement have two hairsprings, both of which would carry electric current. The use of two hairsprings, even when one is a light auxiliary spring, results in a delicate construction which may be difficult to balance and expensive to manufacture.

It is an objective of the present invention to present an electronic horological movement which is relatively sturdy, reliable and low in cost.

In accordance with the present invention, an electronic horological instrument has an oscillator associated with a single hairspring. The oscillator, for example, is a balance wheel in a watch. The balance wheel is mounted upon a staff which has a hub to which the inner end of the hairspring is attached. The balance wheel carries an electrical coil having two terminals and a conductive pin. One terminal of the coil is connected to the pin and the other terminal to the inner end of the hairspring. A spring blade is fixed at one of its ends and cantilevered in position to contact the pin for a predetermined portion of its full oscillation. An electronic circuit, connected to a power source, provides a pulse to the coil through the contact between the spring blade and the pin.

The angle of contact between the spring blade and pin, and the duration of that contact, is predetermined so that the contact begins before, and ends after, the pulse to the coil. This assures that there will be no electrical current through the spring blade and pin at the time of the making or breaking of the physical contact. As there will be no voltage or current across the blade and pin when such making or breaking occur, there is no arcing and the wear and corrosion of the contacts is reduced. The contact made by means of the spring blade and pin substitutes for the second hairspring employed in other types of electronic horological instruments. Compared to the second hairspring, the spring blade and pin are relatively simple, inexpensive and sturdy and do not present any difficulty in regard to the balancing of the balance wheel.

Other objectives of the present invention will be apparent from the description given below of the inventors' best mode of carrying the invention into practice, described in connection with the accompanying drawings.

In the drawings:

FIGS. 6 and 7 are schematic diagrams of a suitable electronic circuit for use in the horological instrument of the present invention; and FIGS. 8 and 9 are diagrams of the timing of the oscillator and of the pulse.

The present invention is described in connection with a wrist watch. However, it should be understood that the invention is also applicable to other types of horological instruments such as pocket watches, automobile clocks and table clocks.

Figure 1:
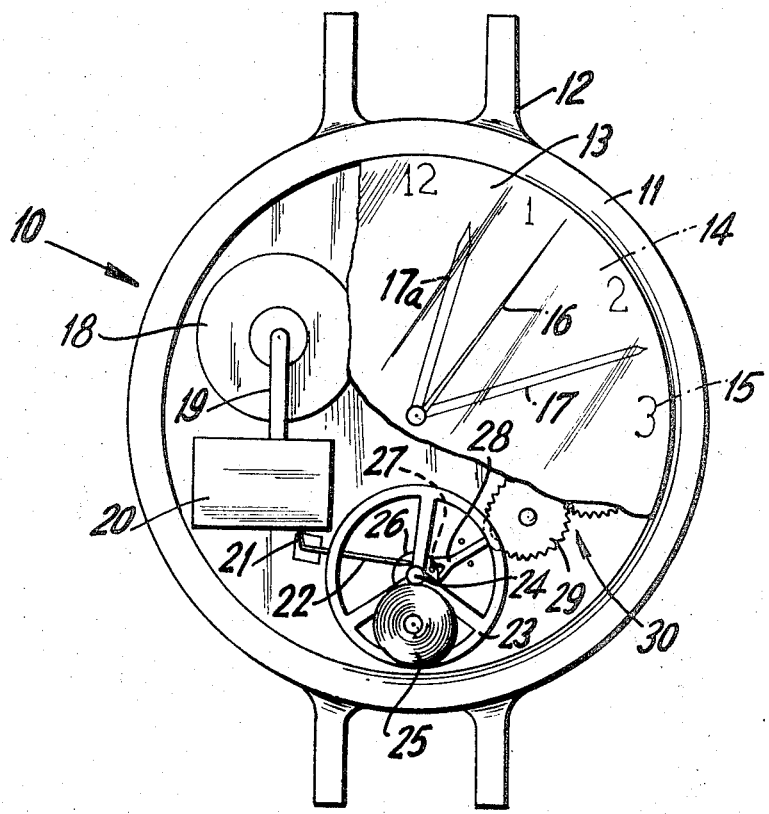
FIG. 1 is a top plan view of a watch of the present invention partly broken away.

As shown in FIG. 1, the watch 10 includes a case 11 having a bezel 12 to which a strap may be attached. The top of the watch is covered by a crystal 13 of plastic or glass. The crystal 13 covers a dial 14 upon which the time indicia 15 is printed. The watch 10 has the conventional type of rotatable hands and includes a seconds hand 16, a minutes hand 17, and an hour hand 17a. The power for the operation of the movement is furnished by a small battery cell 18 within the watch case 11. A contact 19 connects one terminal of the battery 18 to the electrical circuit 20. The other terminal of the battery is grounded to the case. The electronic circuit has an output line 21 which is connected to a spring blade 22.

The time base of the watch is an oscillatable balance wheel 23 which is fixed to its balance wheel staff 24. The balance wheel 23 carries an electric coil 25, consisting of many turns of fine wire. Preferably the coil 25 is round, as seen in its top plan view, although other shapes such as a sector shape may be used. The balance wheel staff 24 has a plateau 26 fixed to it. The plateau 26 has a pin 27 which cooperates with a fork 28 to oscillate the fork back and forth between end positions. The fork, in turn, operates an index wheel 29, which is the first wheel of a conventional gear train 30'. The gear train 30' rotates the hands 16, 17 and 17a.

Figure 2:
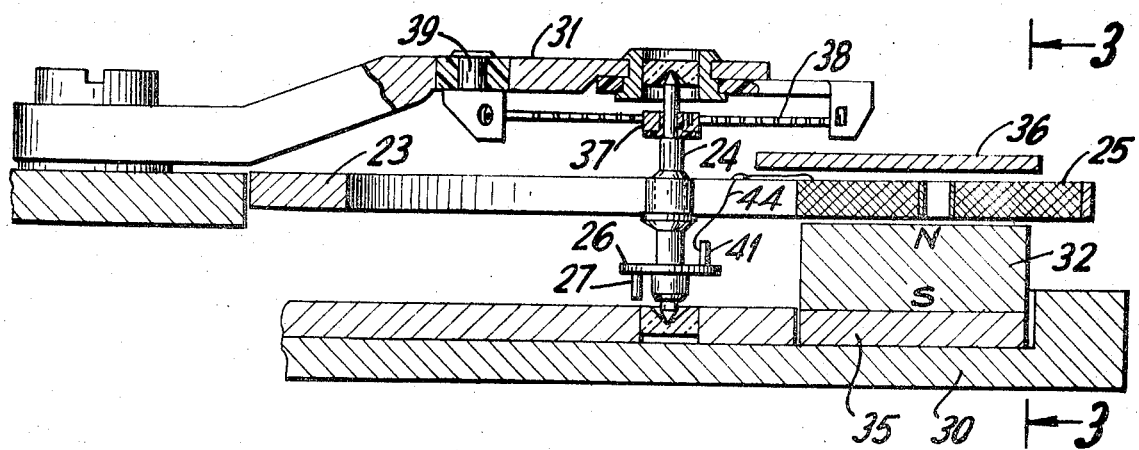
FIG. 2 is a side cross-sectional view of the balance wheel and its associated hairspring, shunt and magnet.
Figure 3:
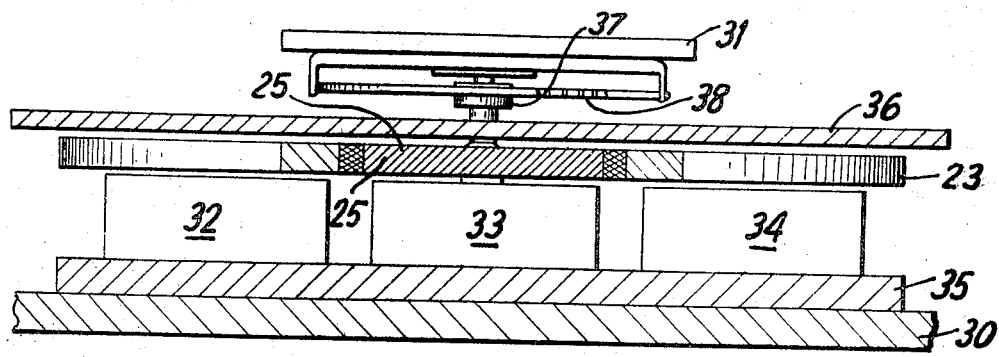
FIG. 3 is a side cross-sectional view, along line 3—3 of FIG. 2, showing the magnet and balance wheel.

As shown in FIGS. 2 and 3, the balance wheel is fixed to the balance wheel staff 24, which pivots between bearings in bottom frame 30 and top bridge member 31. The plateau 26 fixed on staff 24 carries a pin 27. The coil 25 on the balance wheel moves through the magnetic fields created by axially poled permanent magnets 32, 33 and 34, which are positioned on a bottom shunt 35. The fields may, alternatively, be created by coils or by axially poled zones of a single ceramic ferrite magnetic member. A top shunt 36 is positioned above the balance wheel and fixed to the bridge or frame. A hub 37 fixed to staff 24 is connected to the inner end of a conventional flat hairspring 38 whose outer end is connected to metal pin 39. Pin 39 is connected in the metal bridge 31.

Figure 4:
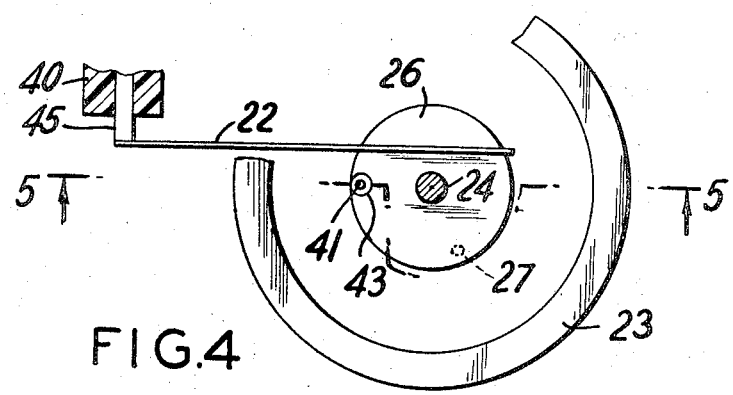
FIG. 4 is a top plan view of the spring blade and balance wheel pin.
Figure 5:
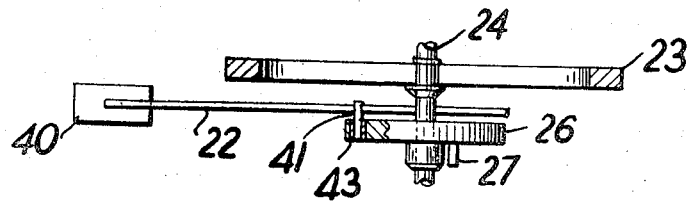
FIG. 5 is a cross-sectional view taken along line 5—5 of FIG. 4.

As shown in FIGS. 4 and 5, a contact to the coil is made through a pin 41 carried by the plateau 26. The pin 41 is embedded in a tubular non-conductive plastic 43 and connected, by wire 44, to the coil 25. The spring 22 is fixed to conductor 45, for example, by solder. Conductor 45 is embedded in plastic member 40, which is attached on the frame.

Figure 6:
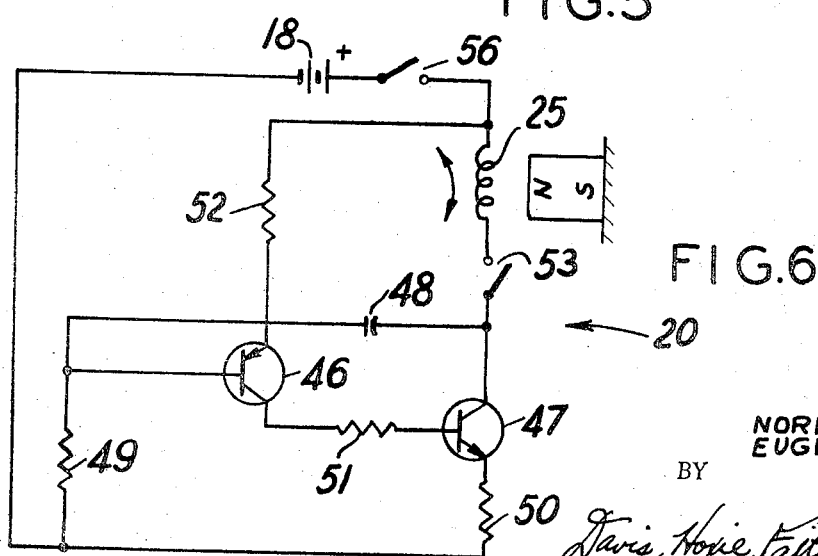

A suitable electronic circuit 20 is shown in FIG. 6. Its operation is explained in the Zemla U.S. Pat. 3,046,460. The circuit includes a complementary pair of transistors, PNP transistor 46 and NPN transistor 47, a capacitor 48, and resistors 49, 50, 51 and 52, contacts 53, and a switch 56. The switch 56 is used to stop the watch when setting the watch hands and to prevent the watch from running before it is sold. The switch 56 connects and disconnects the battery to the coil. The contacts 53 indicate the contact between the spring blade and the pin.

An alternative, and preferred, circuit is shown in FIG. 7. The circuit is similar in some respects to the circuit of FIG. 6, but does not utilize a switch similar to switch 56 of FIG. 6. The circuit of FIG. 7 includes complementary transistors 46a and 47a, capacitor 48a, resistors 49a, 50a, 51a and 52a, and contacts 53a.

Suitable values for the components of the circuits of FIGS. 6 and 7 are given below.

Resistors 57 and 57a—100K ohms
Resistors 49 and 49a—4.7 megohms
Resistors 50 and 50α—1.2K ohms
Resistors 51 and 51a—82K ohms
Resistors 52 and 52a—18K ohms
Battery 18—1.5 volt
Capacitor 48—0.15 µf.
Capacitor 48a—.22 µf.
Coil 25—2200 turns In addition, the circuit of FIG. 7 has a diode 54 between a terminal of resistor 52a and a terminal of contact 53a, and a capacitor 55 (suitable value 1.0 µf.), between the same terminal of resistor 52a and the negative side of battery 18.

In operation, before the watch is sold, or during hand setting, the balance wheel is pivoted so that its contact pin is not touching the contact spring. The setting stem of the watch may have a pin or arm which holds, when the stem is pulled outwardly, the balance wheel in position with its hairspring partially wound. The release of the balance wheel, when the setting stem is pushed inward, starts the watch. The contact spring contacts the pin on the balance wheel, i.e., switch 53a is closed.

Once the contacts 53a are closed, the capacitor 48a is charged and the circuit, which is a relaxation oscillator, will produce an output pulse.

The circuit of FIG. 6, even with the contacts 53 open, will consume power, the current flowing through the emitter and base of transistor 46. That current drain requires the circuit to have the separate switch 56. In contrast, the circuit of FIG. 7 avoids an appreciable current drain when the contacts 53 are open and does not have a separate switch to disconnect the battery from the circuit.

In the circuit of FIG. 7, when contacts 53a are closed and then opened, the capacitor 55 is charged. The charge remains on capacitor 55, the diode 54 preventing its leaking off rapidly. That charge on capacitor 55 makes the voltage at the emitter of transistor 46a almost equal to the battery voltage, thereby presenting a bias condition similar to that found in FIG. 6. The circuit operates in the same manner as the circuit in FIG. 6 as long as capacitor 55 is periodically recharged through the closure of contacts 53a. If the balance wheel is stopped so that contacts 53a are open, capacitor 55 eventually discharges, causing the circuit to cease operation and current to stop flowing.

The diode 54 and the capacitor 55 eliminate the need for the switch 56 in the circuit of FIG. 6 to cut-off stand-by current drain, for example, before the watch is sold.

Other types of drive circuits may be used with the contact system of the present invention.

FIG. 8 shows the closure period during an oscillation of the balance wheel. The coil 25 is in successive positions I, II and III during the clockwise portion of its oscillation. The contact, both during the clockwise and the counterclockwise portions of the full oscillation, is closed for 110°. The pulse 60, of 15°, occurs on the clockwise movement only when the coil 25 is over magnets 34 and 33 (position I). The pulse 61, of 15°, occurs on the counterclockwise movement only when the coil 25 is over the magnets 33 and 32 (position III).

FIG. 9 shows a typical voltage waveform for a contact closed period. Some contact bounce may occur near the leading edge of the closure and near the break, but these breaks do not affect timekeeping and do not deteriorate the contact performance since there is virtually no current flowing at these times.

If the contact closed angle is wide enough and positioned properly to include a complete half sinusoid of induced voltage, as shown in FIGS. 8 and 9, the circuit has been found to operate satisfactorily.

We claim:
1. An electronic horological instrument including a frame, a source of electrical power, an electronic circuit having an output transistor to provide a pulse of determined duration, an oscillator assembly, an electric coil carried by the oscillator assembly, means fixed to said frame and creating a magnetic field through which the coil oscillates, conductive means connected to the coil and carried by the oscillator assembly, a conductive hairspring connected between the frame and the oscillator assembly, means connecting the hairspring to the coil, and a conductive spring connected in series to the transistor of the electronic circuit and having a portion positioned to be intermittently contracted by the oscillator conductive means in its path of oscillation, wherein the transistor provides a pulse which starts after the making of the contact between the spring and conductive means and which terminates before the ending of the said contact, thereby minimizing contact wear.

2. A horological instrument as in claim 1 wherein the electronic circuit further includes a capacitor which when charged by closure of the spring and conductive means permits circuit operation but which when discharged by opening of the spring and conductive means blocks such operation.

3. A horological instrument as in claim 1 wherein the oscillator assembly comprises a balance wheel staff and a balance wheel mounted thereto, and the spring is a flat cantilevered metal spring blade.

4. A horological instrument as in claim 1 wherein the means fixed to the staff and creating a magnetic field comprises three axially and alternatively poled magnets which create three magnetic fields.

5. A horological instrument as in claim 4 wherein the three axially and alternatively poled magnets comprise alternatively poled zones in a single ceramic magnet member.

References Cited
UNITED STATES PATENTS

| | | | |
|---|---|---|---|
| 3,046,460 | 7/1962 | Zemla | 58—23 |
| 3,332,229 | 7/1967 | Klinck et al. | 58—28 |

RICHARD B. WILKINSON, Primary Examiner

E. C. SIMMONS, Assistant Examiner

U.S. Cl. X.R.

318—127